US006757636B2

(12) United States Patent  
Bluestein

(10) Patent No.: US 6,757,636 B2  
(45) Date of Patent: Jun. 29, 2004

(54) COMPUTERIZED ELECTRONIC RUNOUT

(75) Inventor: Keith Bluestein, Midlothian, VA (US)

(73) Assignee: Alstom Technology Ltd., Baden (CH)

( * ) Notice: Subject to any disclaimer, the term of this patent is extended or adjusted under 35 U.S.C. 154(b) by 0 days.

(21) Appl. No.: 10/198,920

(22) Filed: Jul. 19, 2002

(65) Prior Publication Data

US 2004/0015326 A1 Jan. 22, 2004

(51) Int. Cl.⁷ .............................................. G01B 7/00
(52) U.S. Cl. ........................ 702/155; 73/66; 700/279
(58) Field of Search ................................ 702/155, 157, 702/159, 163; 73/66, 457, 146, 105; 700/279; 384/512, 448, 500; 33/203.15

(56) References Cited

U.S. PATENT DOCUMENTS

| | | | | |
|---|---|---|---|---|
| 4,070,762 A | * | 1/1978 | Siddall | 33/174 |
| 4,761,101 A | | 8/1988 | Zettl | 408/6 |
| 4,775,947 A | * | 10/1988 | Marron | 700/279 |
| 5,117,081 A | * | 5/1992 | Bagdal | 219/69.11 |
| 5,140,534 A | | 8/1992 | Miller et al. | 364/560 |
| 5,194,920 A | | 3/1993 | Mattila | 356/400 |
| 5,224,272 A | | 7/1993 | Toraason et al. | 33/504 |
| 5,359,885 A | * | 11/1994 | Ohms | 73/146 |
| 5,507,097 A | | 4/1996 | Duey et al. | 33/286 |
| 5,717,491 A | | 2/1998 | Busch et al. | 356/400 |
| 5,857,812 A | | 1/1999 | Stahl | 408/1 R |
| 5,863,136 A | | 1/1999 | Miyazaki | 384/512 |
| 6,067,848 A | * | 5/2000 | Siegfried et al. | 73/146 |
| 6,148,533 A | | 11/2000 | Hutter | 33/645 |

* cited by examiner

Primary Examiner—John Barlow
Assistant Examiner—Hein Vo
(74) Attorney, Agent, or Firm—Russell W. Warnock

(57) ABSTRACT

A system and method for measuring the radial runout of a shaft, rotatably supported on a standard rest, includes at least a first journal surface sensing assembly, a second journal surface sensing assembly, and a test surface sensing assembly which sense the radial position of the first journal surface, the second journal surface, and a test portion of the shaft, respectively, during rotation of the shaft. A transmitter of each surface sensing assembly transmits a runout signal which is received by a receiver of a computer. Within the computer, the runout signal from the test surface sensing assembly is adjusted with the runout signals from the first and second journal surface sensing assemblies to factor out deflection of the shaft caused by the standard rest and the shaft runout is computed and plotted using the normalized runout data.

16 Claims, 7 Drawing Sheets

COMPUTERIZED ELECTRONIC RUNOUT

BACKGROUND OF THE INVENTION

This invention relates to apparatus and methods for measuring the radial runout of rotating objects. More specifically, the invention relates to apparatus and methods for measuring the radial runout, or circumferential out-of-roundness deviation of a shaft.

Conventional methods of inspecting and measuring the runout of shafts and other such similar parts require the use of precision supports for rotation of either the inspection part or the measurement gauge to establish the parts center or a reference surface. Setup and use of these devices generally requires the labor of several highly trained and skilled technicians. The inspection operation can be very time consuming, labor intensive, expensive and tedious to perform. In some cases, it is extremely difficult to utilize current methods of inspection. This is especially true for large rotating objects, such as generator rotors and turbine assemblies.

Conventional shaft runout measurement techniques typically require the presence of at least two operators. First, the surface of the shaft is prepared by cleaning and ensuring that there are no raised edges which might harm a contact-type gauge. Eight points are then marked around the circumference of the rotor coupling at evenly-spaced intervals of forty-five degrees. The shaft is supported at each end in a precision center, such as a lathe, and is rotated for a predetermined period of time to eliminate weight-induced bowing. As the shaft continues to rotate slowly, one operator positioned near the rotor coupling signals the other operator when each point passes a fixed reference point, the other operator reads the measured runout at five runout points and manually records the measurements. The five runout points include one point on each journal, one point on each coupling and one point intermediate the journals/couplings. All runout measurements are recorded as positive numbers, as only the total indicator runout (TIR) is of interest. On average, the runout measurement operation is performed fifteen times on different sections along the axial length of the rotor. If appropriate, axial runout measurements and shaft float measurements are also taken, axial runout points are adjusted using acceptance tolerances to reflect the actual axial runout, and the values of such measurements are manually recorded. The data collected during the measurement of the runout are then entered into a computer program, such as a spreadsheet, which solves for the Cartesian formula and the runout is manually plotted. After review and approval, the hard-copy runout report is generally stored for archival purposes. When this method is utilized, Runout measurements must be taken each time the machining setup is changed and is generally redone at each shift change to ensure proper setup of the shaft.

As may be easily appreciated, such conventional apparatus and method is man-power intensive and is therefore relatively expensive. Further, the measurement data is handled by personnel four separate times, allowing extensive opportunity for the introduction of error. In addition, the recorded data and the runout plots must be converted to an electronic format if they are to be archived in such form.

SUMMARY OF THE INVENTION

Briefly stated, the invention in a preferred form is a system and methods for measuring the radial runout, or circumferential out-of-roundness deviation of a shaft rotatably supported on a standard rest. The shaft includes a coupling, first and second journal surfaces.

The shaft runout measurement system comprises multiple surface sensing assemblies, including at least a first journal surface sensing assembly, a second journal surface sensing assembly, and a test surface sensing assembly which sense the first journal surface, the second journal surface, and a test portion of the outer surface of the shaft, respectively. Each of the surface sensing assemblies has a surface sensor and a transmitter in electrical communication with the surface sensor. The surface sensors continuously sense the radial position of the associated surface of the shaft. During rotation of the shaft, a transmitter of each surface sensing assembly transmits a runout signal proportional to the runout of the associated surface. Each of the runout signals is received by a receiver of a computer. A test operating system, stored in the memory of the computer, applies a normalization program, also stored in the memory, to compute normalized runout data by adjusting the runout signal from the test surface sensing assembly with the runout signals from the first and second journal surface sensing assemblies to factor out deflection of the shaft caused by the standard rest. The test operating system inserts the normalized runout data into predetermined data cells of a runout spreadsheet stored in the memory. Formulas and instructions stored in operator cells of the runout spreadsheet compute and plot the shaft runout.

The system may also comprise a magnetic field sensing device and a plurality of magnets. The magnets are mounted at radially spaced positions on the shaft coupling. A magnetic field sensor of the magnetic field sensing device is positioned proximate to the shaft. A transmitter in electrical communication with the magnetic field sensor transmits an initiation signal each time a one of the magnets passes the magnetic field sensor. In this system, each of the surface sensing assemblies also includes a receiver and the computer also includes a transmitter. The test operating system causes the computer transmitter to transmit a data request signal each time the computer receiver receives a one of the initiation signals and the transmitter of each surface sensing assembly transmitting a discrete runout signal on receipt of a data request signal by the receiver of the surface sensing assembly.

A method for measuring the runout of the shaft described above comprises the steps of attaching the magnets at radially equidistantly spaced points on the shaft coupling. The magnetic field sensor of the magnetic field sensing device is positioned proximate to the shaft coupling such that the magnets are rotatable through a sensing field of the magnetic field sensor with out contacting the magnetic field sensor. The surface sensors of the first and second journal surface sensing assemblies are positioned for sensing the first and second journal surfaces of the shaft, respectively, and the surface sensor of the test surface sensing assembly is positioned for sensing the test surface portion of the shaft. The shaft is rotated, with the surface sensing assemblies continuously sensing the radial position of the associated surface of the shaft and a test run is initiated. Each time a one of the magnets rotates past the magnetic field sensor, an initiation signal is transmitted from the transmitter of the magnetic field sensing device. Each time the transceiver of the computer receives an initiation signal, the computer transmits a data request signal. Each time the transceiver of the surface sensing assembly receives a data request signal, it transmits a discrete runout signal. The computer receives the discrete runout signals and normalizes the runout signal from the test surface sensing assembly to factor out deflection of the shaft caused by the standard rest. The normalized runout signals are then inserted into predetermined data cells of a runout spreadsheet stored in memory of the computer and the runout spreadsheet computes and plots the runout.

It is an object of the invention to provide more efficient systems and methods for measuring the runout of a shaft.

It is also an object of the invention to provide systems and methods for measuring the runout of a shaft which require less operator action and input and are therefore less prone to error.

Other objects and advantages of the invention will become apparent from the drawings and specification.

BRIEF DESCRIPTION OF THE DRAWINGS

The present invention may be better understood and its numerous objects and advantages will become apparent to those skilled in the art by reference to the accompanying drawings in which.

DETAILED DESCRIPTION OF THE PREFERRED EMBODIMENT

Figure 1:
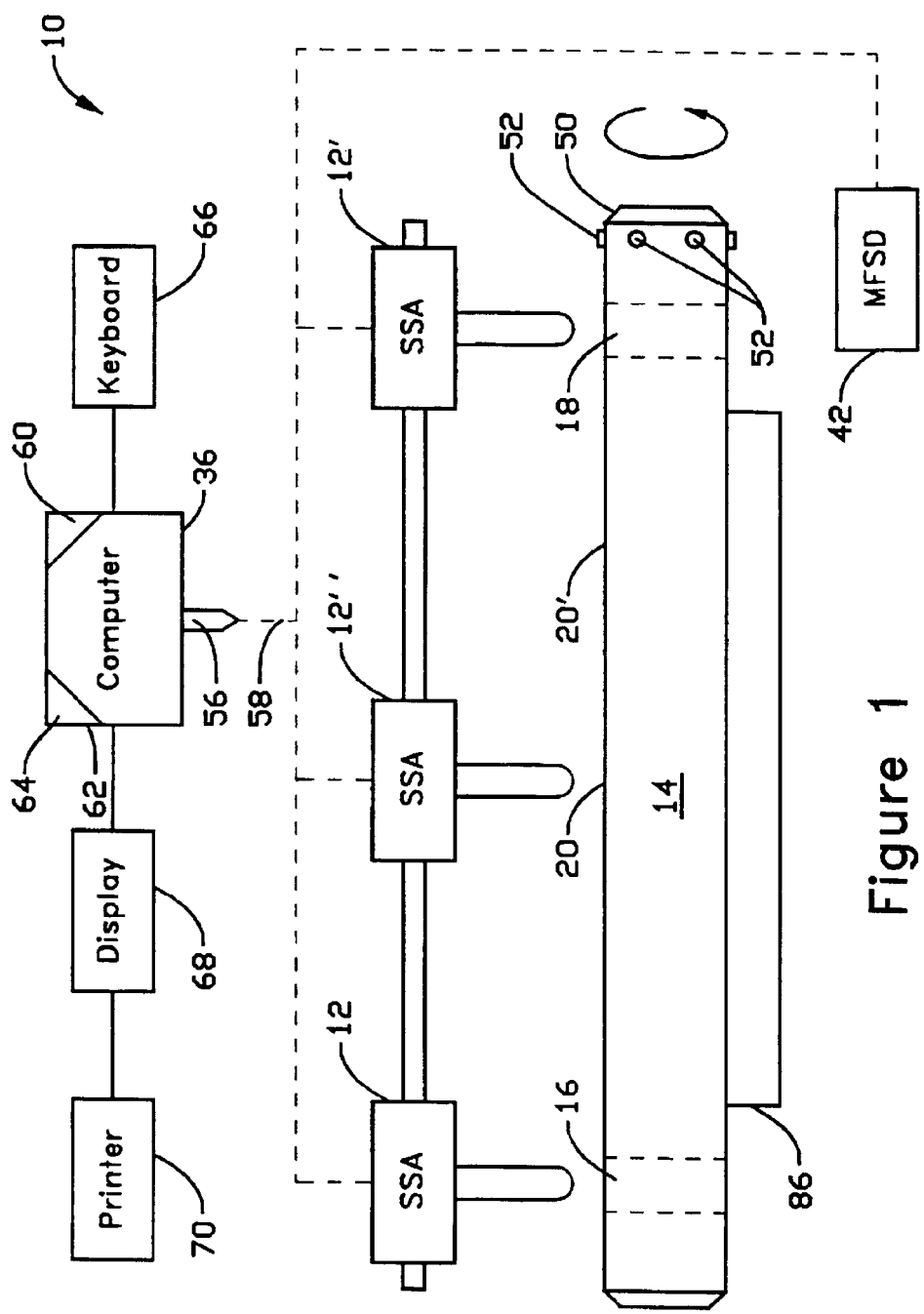
FIG. 1 is a schematic diagram of a computerized electronic runout measurement system in accordance with the invention.
Figure 2:
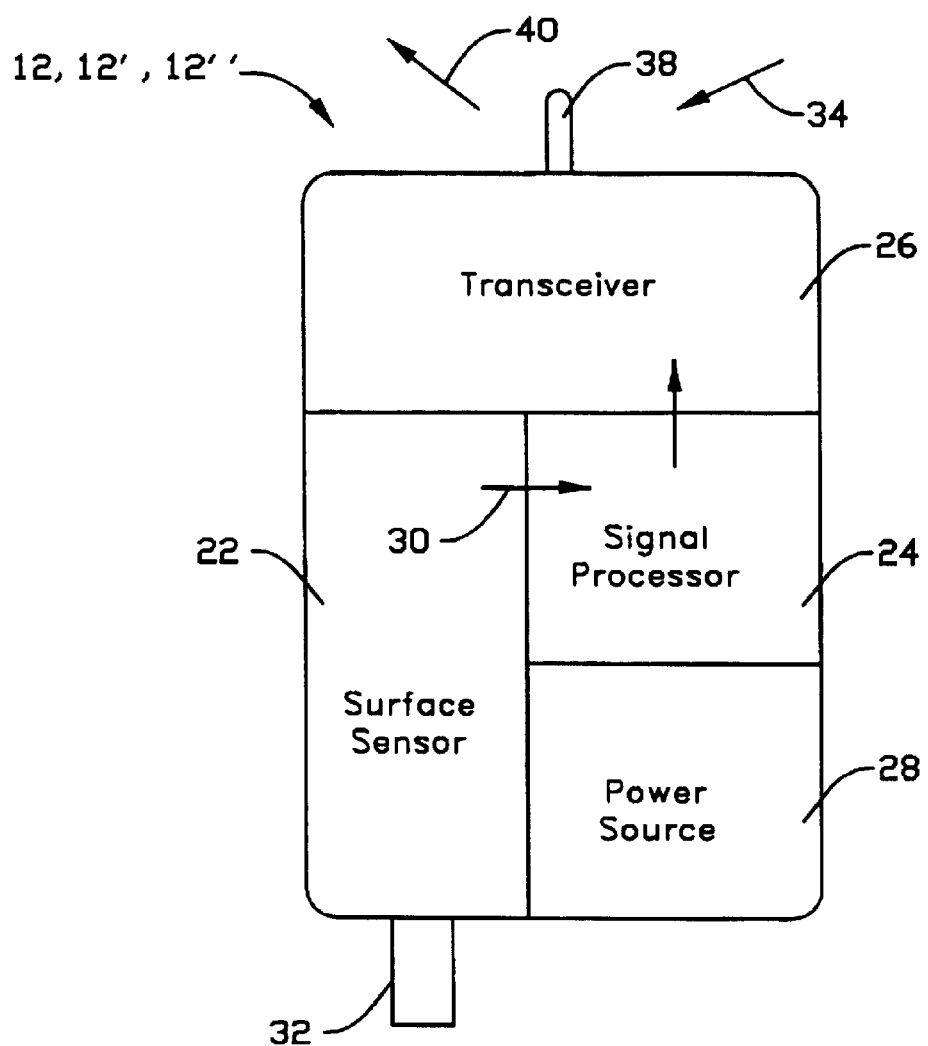
FIG. 2 is a block diagram of one of the surface sensing assemblies of FIG. 1.
Figure 3A:
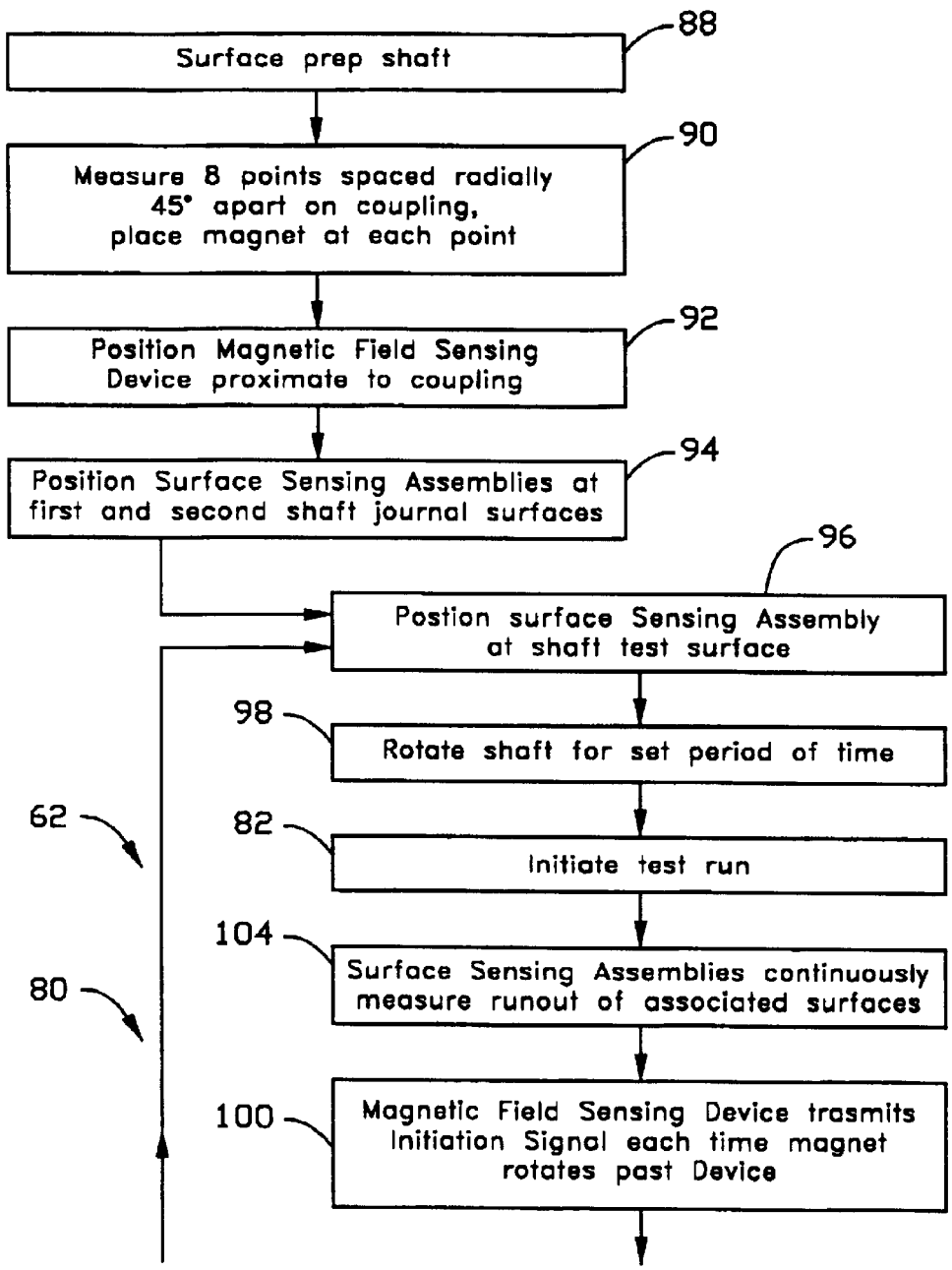
FIGS. 3a and 3b are a flow diagram of a first embodiment of a method of measuring shaft runout in accordance with the invention.
Figure 3B:
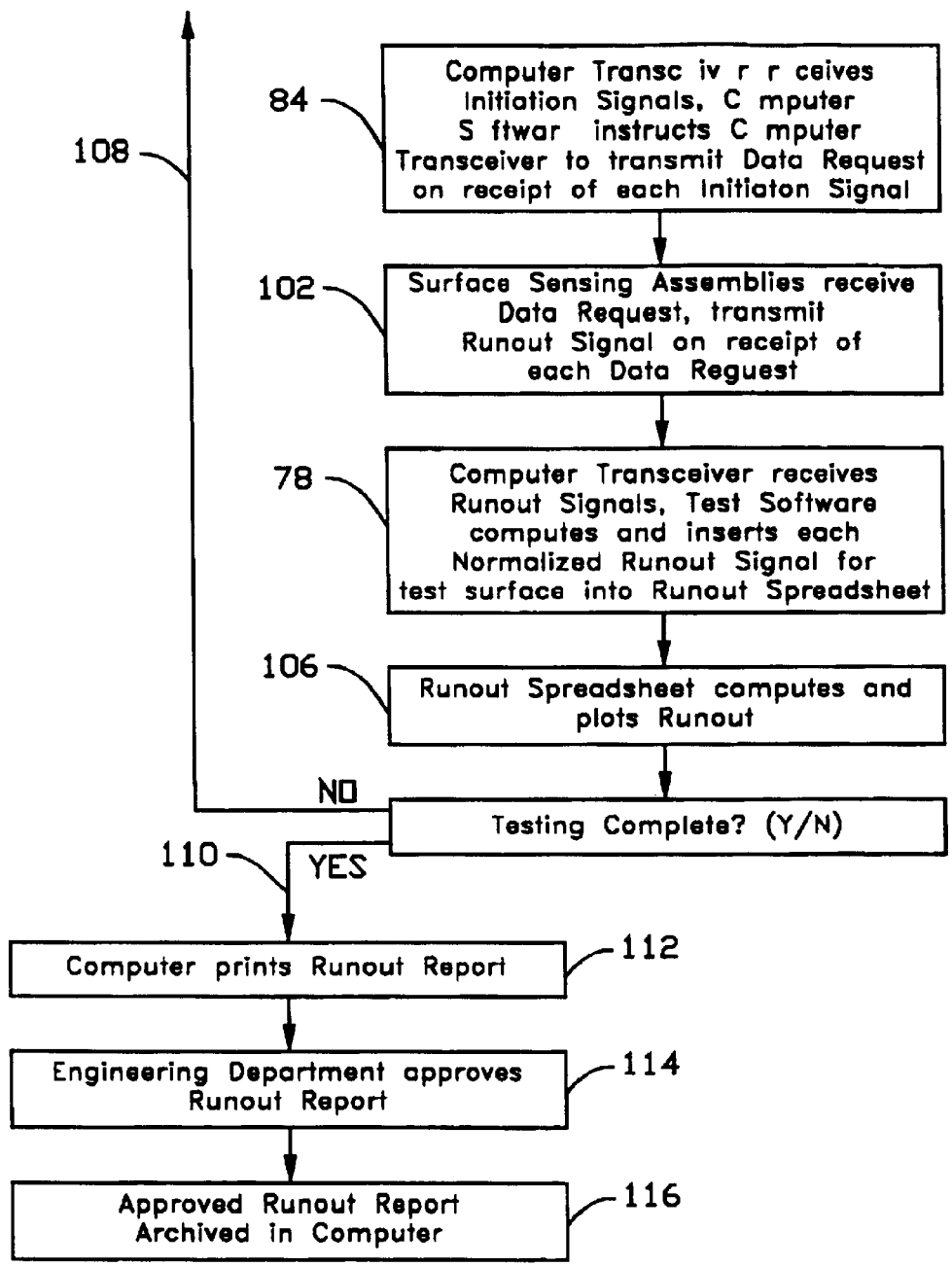

Referring to FIG. 1, in a first embodiment of a measurement system 10 in accordance with the invention, surface sensing assemblies (SSA) 12, 12', 12" sense the surface of the shaft 14, with journal surface sensing assemblies 12, 12' at the first and second journal surfaces 16, 18 of the shaft 14 and a test surface sensing assembly 12" at a test portion 20 of the shaft 14. With additional reference to FIG. 2, each surface sensing assembly 12, 12', 12" is a compact, stand-alone unit which includes a surface sensor 22, a signal processor 24, a transceiver 26 and a power source 28. It should be appreciated that a transceiver includes both transmitter and receiver apparatus. Each surface sensing assembly 12, 12', 12" is positioned such the surface sensor 22 may continuously monitor the associated surface 16, 18, 20 of the shaft 14.

The surface sensor 22 measures the radial position of the surface 16, 18, 20 of the shaft 14 relative to the centerline or a datum and may be any surface sensor 22 providing an electrical output signal 30 and having an accuracy and tolerance appropriate for the task. Generally, shaft runout measurements require a surface sensor 22 having an accuracy of 0.01 millimeter. Given the accuracy and relative costs of conventional surface sensors 22 at the time of the invention, a digital dial indicator was selected for use. A contact member 32 of the surface sensor 22 is adapted to bear against the associated surface 16, 18, 20 of the shaft 14. As the shaft 14 is rotated about its central axis, any deviation in the circumference causes the contact member 32 to flex or change its position. This change in position is employed to supply an electrical signal 30, in the known manner, which is proportional to the extent of the change of position of the contact member 32.

The transceiver 26 provides wireless communications to and from the surface sensing assembly 12, 12', 12", transmitting a "snapshot" of the surface measurement (the "runout signal") in response to a data request signal 34 received from a computer 36, as explained in greater detail below. The transceiver 26 includes an antenna 38 for receiving the data request signal 34 and transmitting the runout signal 40. The signal processor 24 converts the signal 30 from the surface sensor 22 to a form which is compatible for transmission by the transceiver 26. The power source 28 provides any power which is required for operation of the surface sensor 22, the signal processor 24, and the transceiver 26, including the energy required for transmission of the runout signal 40 and detection of the data request signal 34.

Figure 5:
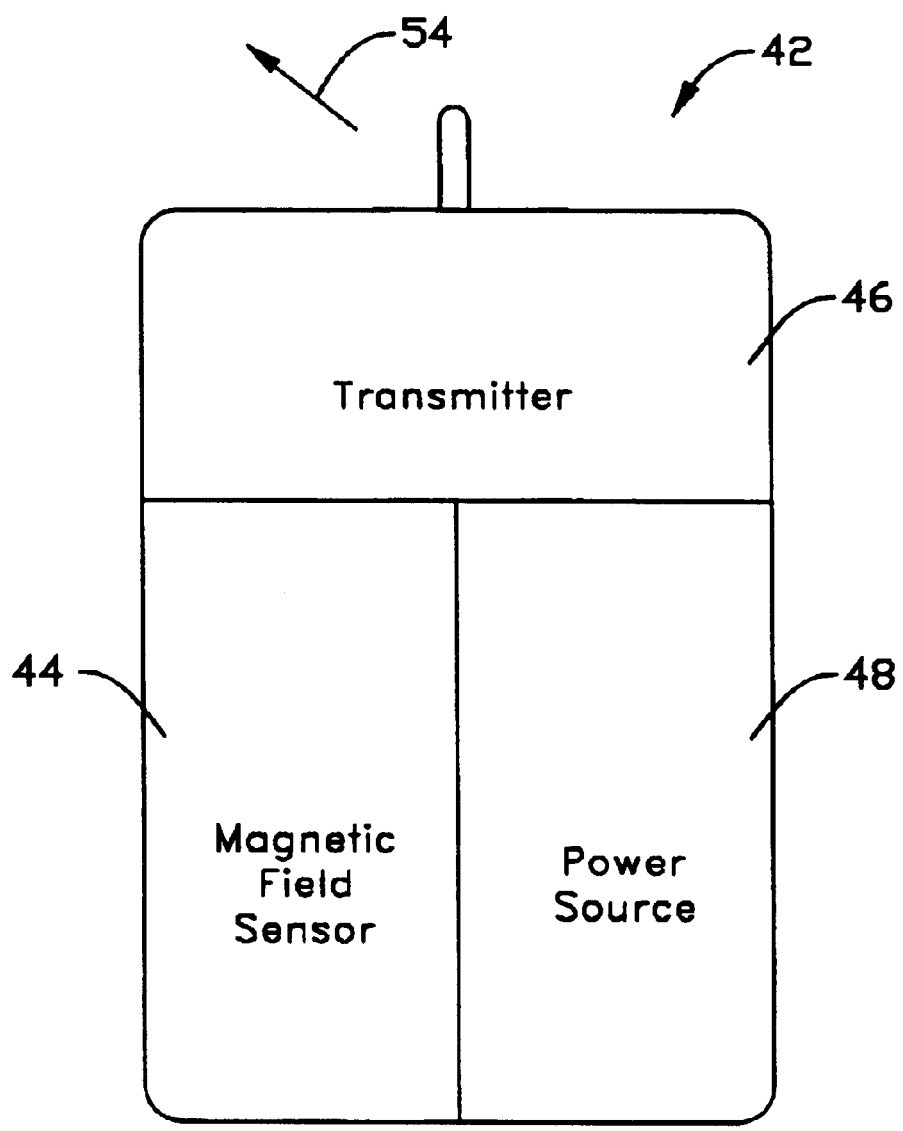
FIG. 5 is a block diagram of the magnetic field sensing device of FIG. 1.

The angular position of each snapshot is determined by a magnetic field sensing device (MFSD) 42 positioned adjacent the shaft 14. With reference to FIG. 5, the magnetic field sensing device 42 is, like the surface sensing assembly 12, 12', 12", compact and easily portable. Preferably, the magnetic field sensing device 42 is a stand-alone unit having a magnetic field sensor 44, a transmitter 46, and a power supply 48. The magnetic field sensor 44, such as a reed sensor, is positioned adjacent the periphery of the shaft coupling 50. Small magnets 52 are removably attached to the shaft coupling 50 at a predetermined number of radially equidistantly spaced points on the coupling 50 in a manner to permit the magnets 52 to pass by magnetic field sensor 44 without contact. In a preferred embodiment, eight magnets 52 are radially spaced 45° apart. Each time a magnet 52 is rotated by the magnetic field sensor 44 it's passage is sensed by the magnetic field sensor 44 and an initiation signal 54 transmitted to the computer 36 by the transmitter 46. Preferably, the transmitter 46 is a radio transmitter to provide for a relatively long communications range. However, the transmitter 46 may use any means of wireless communications.

The computer 36 includes a transceiver 56 for communicating with the surface sensing assembly transceivers 26 and the magnetic field sensing device transmitter 46. In a preferred embodiment, the computer 36 is a laptop computer to provide for portability and ease of use. Alternatively, a large, centrally located computer 36 may also be used. If the computer 36 is a lap top, the transceiver 56 will include apparatus, such as an antenna 58, for sending and receiving signals. If a centrally located computer 36 is used, sending and receiving apparatus may be located in each location having machinery to be tested. Such sending and receiving apparatus is connected to the transceiver 56 via suitable communications lines (not shown).

The computer 36 also includes at least sufficient memory 60 to store all necessary operating programs, test software 62, and a runout spreadsheet 64 for computing and graphing the runout. Generally, the computer 36 will further include a keyboard 66, a screen display 68, and an output connection to a printer 70. It should be appreciated that most conventional laptop and desktop computers 36 available at the time of the filing of the subject application are suitable for use with the subject process.

Figure 6:
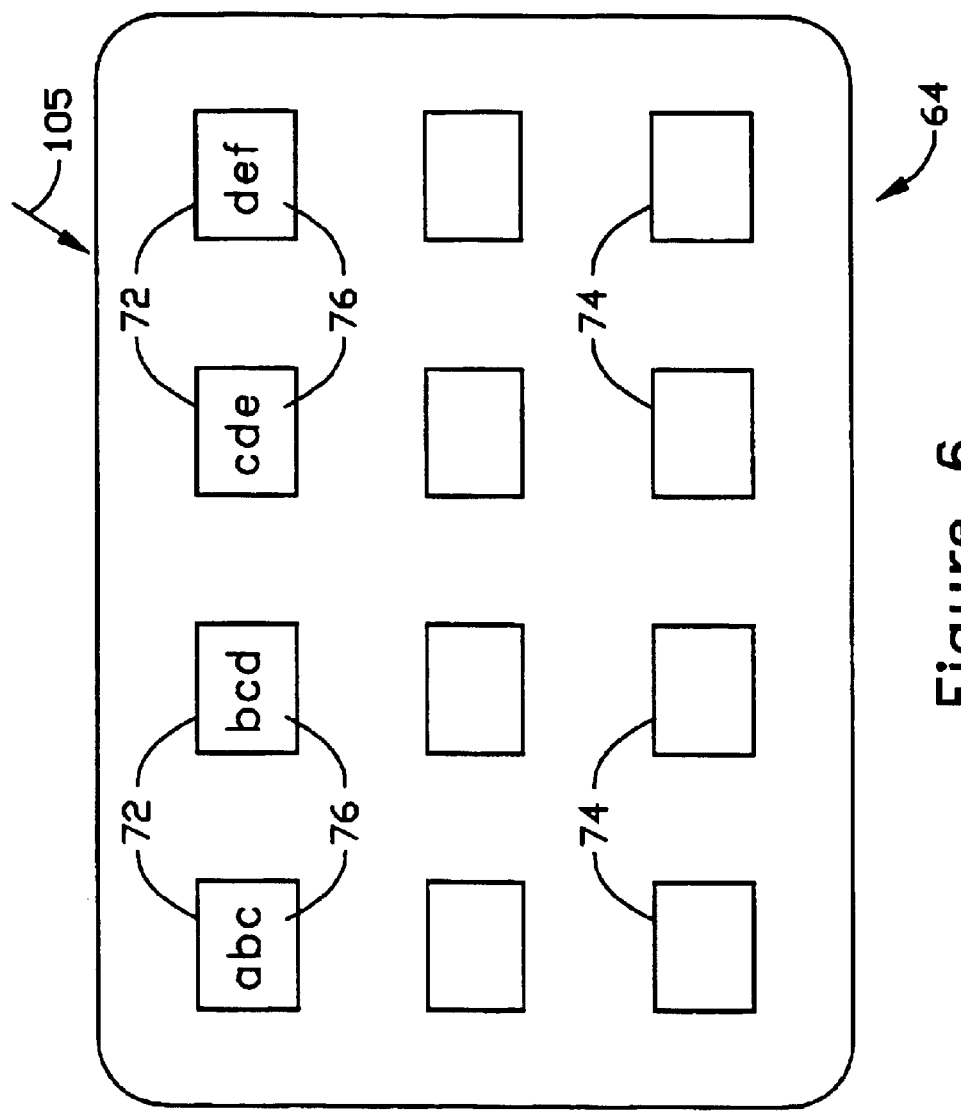
FIG. 6 is a block diagram of the runout spreadsheet of FIG. 3.

With reference to FIG. 6, the runout spreadsheet 64 includes a plurality of data cells 72 and operator cells 74, as is known in the art. Each data cell 72 of the runout spreadsheet 64 is identified by a unique marker 76 which allows the test software 62 to store 78 the normalized runout measurements 105 computed by the normalization program, as explained below. The operator cells 74 store formulas for computing the runout and instructions for plotting the runout.

The test software 62 includes data fields and the test operating system 80. The test operating system 80 prompts 82 the operator to enter certain test parameters which are stored in assigned data fields of the software 62. Such test parameters include the number ($N_M$) of magnets 52 that are mounted on the shaft coupling 50, the number of surface sensing assemblies 12, 12', 12" that are being utilized in the test, and the axial location ($D_n$, $D_L$, $D_R$) on the shaft 14 of each of the surface sensing assemblies 12, 12', 12". The test software 62 also includes data fields containing spreadsheet information identifying the data cell markers 76. The test operating system 80 also instructs 84 the computer transceiver 56 to transmit a data request 34 on the receipt of an initiation signal 54 from the magnetic field sensing device 42, counts-down the number of initiation signals 54 received from the magnetic field sensing device 42 from the value of $N_M$ entered into the data field to determine the end of each test run, and assigns 78 the normalized runout signals 105 to the appropriate data cell 72 based on the spreadsheet information stored in the data fields.

Further, the test software 62 contains a normalization routine 78 which factors out rotor deflection caused by the standard rest 86 on which the shaft is placed during the test, computing a normalized runout signal 105 for the surface sensing assembly 12" at the shaft test surface 20 and eliminating the need for a precision rest.

$$\hat{R}_n = R_n - B_n$$

where $\hat{R}_n$ is the normalized runout signal 105 of the surface sensing assembly 12" for the shaft test surface 20 and $B_n$ is the normalized base and $$B_n = (1 - A_n) R_L + A_n R_R$$

where $R_L$ is the runout signal from the surface sensing assembly 12 for the left journal surface 16, $R_R$ is the runout signal from the surface sensing assembly 12' for the right journal surface 18, and $A_n$ is the weighted average and $$A_n = (D_n - D_L)/(D_R - D_L)$$

where $D_n$, $D_L$, $D_R$ are the axial location or distance of the surface sensing assemblies 12", 12, 12' at the test surface 20, the left journal surface 16, and the right journal surface 18, respectively.

In preparation for measuring the radial runout of a shaft 14, the surface of the shaft 14 is prepared 88 by removing any raised edges which might damage the surface sensors 22 and by cleaning the shaft 14 to remove any dirt, oil, etc. which might otherwise interfere with the test procedure. The shaft 14 is then supported on a standard rest 86, such as a V-stand, rollers, or the like and a predetermined number of radially equidistantly spaced points are measured 90 on the shaft coupling 50 and a small magnet 52 is removably attached to the shaft coupling 50 at each such point. The magnetic field sensing device (MFSD) 42 is positioned 92 proximate to the shaft coupling 50 in a manner that permits the magnets 52 to pass by the magnetic field sensor 44 without contact as the shaft 14 rotates. Surface sensing assemblies (SSA) 12, 12', 12" are positioned 94, 96 such that the surface sensors 22 may continuously monitor the first and second journal surfaces 16, 18 of the shaft 14 and a selected test portion 20 of the shaft 14. Finally, the shaft 14 is rotated 98 on the rest 86 for a set period of time to allow elimination of gravity-induced slump in the shaft 14, as is known in the art.

The test run is initiated 82 after shaft slump has been eliminated. The first magnet 52 to rotate past the magnetic field sensor 44 after the run initiation causes the magnetic field sensing device transmitter 46 to transmit 100 a "first" initiation signal 54 to the computer 36. As each subsequent magnet 52 mounted on the shaft coupling 50 passes the magnetic field sensor 44, a subsequent initiation signal 54 is transmitted to the computer transceiver 56. Each initiation signal 54 received by the computer transceiver 56 actuates the test software 62 to instruct 84 the computer transceiver 56 to transmit a data request signal 34 to the surface sensing assembly transceiver 26. Each data request signal 34 received by the surface sensing assembly transceiver 26 actuates 102 the signal processor 24 to transmit a runout signal 40 to the computer transceiver 56. It should be appreciated that the runout signal 40 from each surface sensing assembly 12, 12', 12" comprises a snapshot of the measured value of the associated surface at the time the data request signal 34 is received, since the surface sensing assemblies 12, 12', 12" continuously measure 104 the runout of such associated shaft surface portion 16, 18, 20. The normalization routine normalizes 78 the runout signal 40 from the surface sensing assembly 12" monitoring the test portion 20 of the shaft 14 and the test software 62 correlates each normalized runout signal 105 with the initiation signal 54 that caused the runout signal 40 to be initiated and stores the normalized runout signal 105 in the corresponding data cell 72 of the runout spreadsheet 64. The runout spreadsheet 64 automatically computes 106 and plots the runout as the data cells 72 are filled by the test software 62. The test software 62 also "counts down" the number of initiation signals 54 which have been received from the number of magnets $N_M$ stored in memory 60 to determine when the test run has been completed.

Runout measurements are generally taken at a plurality of locations along the length of the shaft 14. If additional test runs must be made 108, the test surface sensing assembly 12" is positioned 96 at another test portion 20' of the shaft 14, the shaft 14 is rotated 98 to eliminate slump if necessary, and a test run is initiated 82. If a sufficient number of runout measurements have been performed 110, the runout test is terminated and the test software 62 causes a runout report and runout plot to be printed 112. Generally, the runout report and runout plot will be reviewed and approved 114 as part of conventional test procedures. The approved runout report and runout plot are then stored 116 in memory 60 in the computer 36, eliminating the need to retain a hard-copy.

Figure 4:
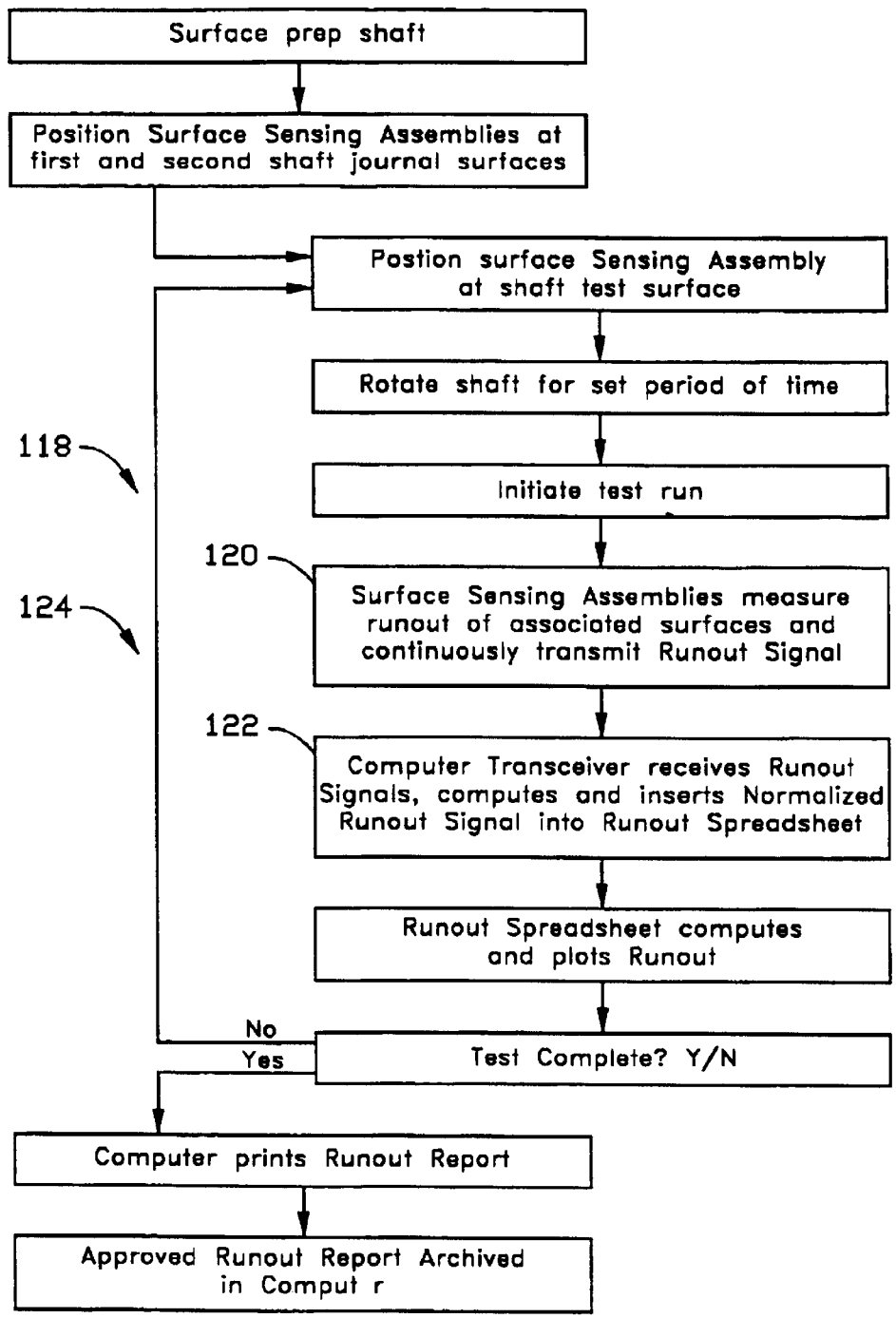
FIG. 4 is a flow diagram of a second embodiment of a method of measuring shaft runout in accordance with the invention.

It should be appreciated that additional tests may be performed utilizing the subject measurement system 10 which cannot be performed utilizing conventional measurement systems. One such test, FIG. 4, is similar to the first method except it takes advantage of the fact that the surface sensing assemblies 12, 12', 12" continuously measure the runout of the associated surface 16, 18, 20. In this test 118, the runout signal is continuously transmitted 120 to the computer 36 by the surface sensing assemblies 12, 12', 12". As shown in the Figure, the test software may compute 122 the normalized runout, divide the normalized runout into a series of "snapshots", utilizing the known rate of rotation of the shaft 14 and a clock reading and, assign the discrete runout signals into data cells 72 of a runout spreadsheet 64. This variation 118 provides an output which is similar to that of the first method but eliminates the need for the magnetic field sensing device 42 and the magnets 52. In addition, the surface sensing assembly transceiver 26 may be replaced with a simple transmitter. It should be appreciated that this method 118 allows the circumferential surface of the shaft 14 at the test surface 20 to be divided into any number of test points. Alternatively, the test software 124 may provide a continuous reading of the normalized runout which may be displayed and/or plotted in real time.

It should be appreciated that the subject measurement system 10 and methods may also be used for measuring the alignment status of shafts. In certain types of rotating machinery, for example turbine-generators, the shaft comprises multiple shaft segments which are cocentrically coupled together. Alignment status refers to the actual position of the shaft segments, after assembly and during use. The straightness of alignment is an essential factor particularly for the operation of large and rapidly rotating machinery, as non-alignment of the shaft segments will lead to deflection and vibration.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A system for measuring the runout of a shaft rotatably supported on a standard rest, the shaft extending longitudinally from a first end to a second end and having an outer surface, a coupling, a first journal surface, and a second journal surface, the system comprising:

a plurality of surface sensing assemblies including at least a first journal surface sensing assembly, a second journal surface sensing assembly, and a test surface sensing assembly adapted for sensing the first journal surface, the second journal surface, and a test portion of the outer surface positioned at a location other than the first and second journal surfaces, respectively, each of the surface sensing assemblies having a surface sensor and a transmitter in electrical communication with the surface sensor, the surface sensor being adapted for continuously sensing the radial position of the associated surface of the shaft a computer including a receiver, a memory in electrical communication with the receiver, a test operating system stored in the memory, a normalization program stored in the memory, and a runout spreadsheet program stored in the memory, the runout spreadsheet program having a plurality of data cells adapted for storing runout data and a plurality of operator cells storing formulas and instructions for operating on the data stored in the data cells;

wherein during rotation of the shaft, the transmitter of each surface sensing assembly transmits a runout signal proportional to the run out of the associated surface, the computer receiver receives the runout signals transmitted by the surface sensing assemblies, the test operating system applies the normalization program to compute normalized runout data by adjusting the runout signal from the test surface sensing assembly with the runout signals from the first and second journal surface sensing assemblies to factor out deflection of the shaft caused by the standard rest, the test operating system inserts the normalized runout data into predetermined data cells of the runout spreadsheet, and the formulas and instructions stored in the operator cells of the runout spreadsheet compute and plot the shaft runout; and a magnetic field sensing device and a plurality of magnets, the magnets being adapted for mounting at radially spaced positions on the shaft coupling, the magnetic field sensing device having a magnetic field sensor disposed proximate to the shaft and a transmitter in electrical communication with the magnetic field sensor, the magnetic field sensing device transmits an initiation signal each time one of the magnets passes the magnetic field sensor.

2. The system of claim 1 wherein each of the surface sensing assemblies also includes a receiver and the computer also includes a transmitter, the test operating system causing the computer transmitter to transmit a data request signal each time the computer receiver receives one of the initiation signals and the transmitter of each surface sensing assembly transmitting a discrete runout signal on receipt of a data request signal by the receiver of the surface sensing assembly.

3. The system of claim 2 wherein the magnetic field sensing device and each of the surface sensing assemblies also includes a power source.

4. The system of claim 1 wherein each of the surface sensing assemblies also includes a signal processor electrically disposed intermediate the surface sensor and the transmitter.

5. A system for measuring the runout of a shaft rotatably supported on a standard rest, the shaft extending longitudinally from a first end to a second end and having an outer surface, a coupling, a first journal surface, and a second journal surface, the system comprising:

a plurality of surface sensing assemblies including at least a first journal surface sensing assembly, a second journal surface sensing assembly, and a test surface sensing assembly adapted for sensing the first journal surface, the second journal surface, and a test portion of the outer surface positioned at a location other than the first and second journal surfaces, respectively, each of the surface sensing assemblies having a surface sensor and a transceiver in electrical communication with the surface sensor, the surface sensor being adapted for continuously sensing the radial position of the associated surface of the shaft;

a plurality of magnets adapted for mounting at radially spaced positions on the shaft coupling;

a magnetic field sensing device including a magnetic field sensor disposed proximate to the shaft coupling and a transmitter in electrical communication with the magnetic field sensor; and a computer including a transceiver, a memory in electrical communication with the transceiver, a test operating system stored in the memory, a normalization program stored in the memory, and a runout spreadsheet program stored in the memory, the runout spreadsheet program having a plurality of data cells adapted for storing runout data and a plurality of operator cells storing formulas and instructions for operating on the data stored in the data cells;

wherein during rotation of the shaft, the magnetic field sensing device transmits an initiation signal each time a one of the magnets passes the magtnic field sensor, the test operating system causes the computer to transmit a data request signal each time the computer receives a one of the initiation signals, each surface sensing assembly transmits a discrete runout signal proportional to the runout of the associated surface on receipt of a data request signal, the test operating system applies the normalization program to compute normalized runout data by adjusting the runout signal from the test surface sensing assembly with the runout signals from the first and second journal surface sensing assemblies to factor out deflection of the shaft caused by the standard rest, the test operating system inserts the normalized runout data into predetermined data cells of the runout spreadsheet, and the formulas and instructions stored in the operator cells of the runout spreadsheet compute and plot the shaft runout and wherein the magnetic field sensing device and each of the surface sensing assemblies also includes a power source.

6. The system of claim 5 wherein each of the surface sensing assemblies also includes a signal processor electrically disposed intermediate the surface sensor and the transmitter.

7. A method for measuring the runout of a shaft rotatably supported on a standard rest, the shaft extending longitudinally from a first end to a second end and having an outer surface, a coupling, a first journal surface, and a second journal surface, the method comprising the steps of:
A) attaching a plurality of magnets at radially equidistantly spaced points on the shaft coupling;
B) positioning a magnetic field sensor of a magnetic field sensing device proximate to the shaft coupling whereby the magnets are rotatable through a sensing field of the magnetic field sensor without contacting the magnetic field sensor;
C) positioning a surface sensor of a first journal surface sensing assembly and a surface sensor of a second journal surface sensor assembly for sensing the first and second journal surfaces of the shaft, respectively;
D) positioning a surface sensor of a test surface sensing assembly for sensing a test surface portion of the shaft;
E) rotating the shaft, the surface sensing assemblies continuously sensing the radial position of the associated surface of the shaft;
F) initiating a test run;
G) transmitting an initiation signal from a transmitter of the magnetic field sensing device each time a one of the magnets rotates past the magnetic field sensor;
H) transmitting a data request signal from a transceiver of a computer each time the transceiver of the computer receives an initiation signal;
I) transmitting a discrete runout signal from a transceiver of each of the surface sensing assemblies each time the transceiver of the surface sensing assembly receives a data request signal;
J) receiving the discrete runout signals at the computer and normalizing the runout signal from the test surface sensing assembly to factor out deflection of the shaft caused by the standard rest;
K) inserting the normalized runout signals into predetermined data cells of a runout spreadsheet stored in memory of the computer; and
L) computing and plotting runout with the runout spreadsheet.

8. The method of claim 7 wherein step (F) comprises the sub-steps of entering test parameters into a test operating system stored in the memory of the computer, the test parameter including the number ($N_M$) of magnets mounted on the shaft coupling and the longitudinal location ($D_n$, $D_L$, $D_R$) on the shaft of each surface sensing assembly.

9. The method of claim 8 further comprising the step of M) determining whether runout testing has been completed.

10. The method of claim 9 wherein step (M) comprises the sub-steps of:
1) logically determining whether the test run has been completed by
   i) keeping a running total of the number of initiation signals received from the magnetic field sensing device since step (F),
   ii) determining that the test run has been completed when $N_M$ equals the initiation signal running total, and
2) determining whether the shaft runout has been measured at a sufficient number of test surface portions of the shaft.

11. The method of claim 10 wherein steps (D) through (M) are repeated, with the surface sensor of the test surface sensing assembly being moved to sense a different test portion of the shaft, if it is determined that runout testing has not been completed.

12. The method of claim 10 further comprising the step of N) printing runout report, if it is determined that runout testing has been completed.

13. The method of claim 7 wherein during step (J), the discrete runout signal is normalized utilizing the relationship:

$$\hat{R}_n = R_n - (1 - ((D_n - D_L)/(D_R - D_L)))R_L + ((D_n - D_L)/(D_R - D_L))R_R$$

wherein $\hat{R}_n$ is the normalized runout signal of the test surface sensing assembly, $R_L$ is the runout signal from the first journal surface sensing assembly, and $R_R$ is the runout signal from the second journal surface sensing assembly.

14. A method for measuring the runout of a shaft rotatably supported on a standard rest, the shaft extending longitudinally from a first end to a second end and having an outer surface, a coupling, a first journal surface, and a second journal surface, the method comprising the steps of:
A) positioning a surface sensor of a first journal surface sensing assembly, a surface sensor of a second journal surface sensor assembly, and a surface sensor of a test surface sensing assembly for sensing the first journal surface of the shaft, the second journal surfaces of the shaft, and a test surface portion of the shaft, respectively;
B) rotating the shaft, the surface sensing assemblies continuously sensing the radial position of the associated surface of the shaft;
C) initiating a test run;
D) transmitting a runout signal from each of the surface sensing assemblies;
E) receiving the runout signals at the computer and normalizing the runout signal from the test surface sensing assembly to factor out deflection of the shaft caused by the standard rest;
F) computing and plotting the shaft runout.

15. The method of claim 14 further comprising the step of G) dividing the runout signals from the surface sensing assemblies into discrete segments prior to normalizing the runout signal from the test surface sensing assembly.

16. The method of claim 15 wherein step (F) comprises the sub-steps of:
1) inserting the normalized runout signal segments into predetermined data cells of a runout spreadsheet stored in memory of the computer; and
2) computing and plotting runout with the runout spreadsheet.

* * * * *